J. SPANITZ.
RETAINER FOR ANTIFRICTION BEARINGS.
APPLICATION FILED JULY 14, 1920.

1,365,426.

Patented Jan. 11, 1921.

Inventor:
Joseph Spanitz
By Bruce King
Attorney

UNITED STATES PATENT OFFICE.

JOSEPH SPANITZ, OF CHICAGO, ILLINOIS.

RETAINER FOR ANTIFRICTION-BEARINGS.

1,365,426.      Specification of Letters Patent.      Patented Jan. 11, 1921.

Application filed July 14, 1920. Serial No. 396,178.

*To all whom it may concern:*

Be it known that I, JOSEPH SPANITZ, a citizen of the United States, residing at Chicago, Cook county, Illinois, have invented certain new and useful Improvements in Retainers for Antifriction-Bearings, of which the following, taken in connection with the drawing, is a description.

My invention relates to retainers for anti-friction bearings of the class more generally known as annular ball bearings and the object thereof is to provide means for maintaining the balls or rotative elements in certain spaced relationship with respect to each other and to the bearing.

It is an object of my invention to provide a retainer of this kind which shall be formed of a plurality of interlocking sections forming a retaining ring, each section being formed to construct a portion of the retainer embracing opposite sides of two separate rotative elements, each section having interlocking connection with two other like sections, all of which form a retainer of sufficient rigidity and strength both laterally and circumferentially to maintain the rotative elements in proper rotative positions.

It is a further object of my invention to provide adequate surface contact with the balls or rotative elements to secure uniform balancing of the balls through the center thereof and at right angles to the axis of the bearing.

A further object of my invention is to provide a retainer which shall be simple and easy to construct and assemble, one which will receive lubricant if desired and one which will in all respects meet the requirements necessary in a structure of this kind.

In the accompanying drawings I have illustrated what I now consider the preferred form of an embodiment of my invention although I wish to be understood as contemplating such changes in size, proportions and details thereof contemplated within the scope of the invention as defined by the claims, and in these drawings:

Figure 1:
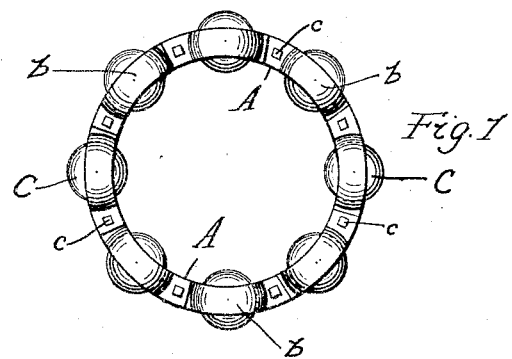
Figure 1 is a plan view of the assembled form of my invention.
Figure 2:
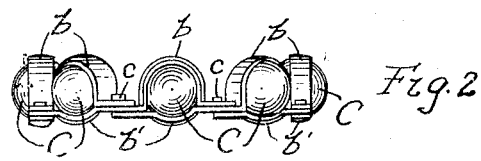
Fig. 2 is a side elevation thereof.
Figure 3:
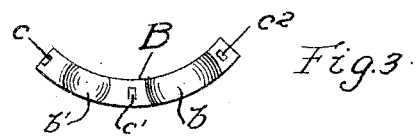
Fig. 3 is a top plan view of one of the sections forming the retainer.
Figure 4:
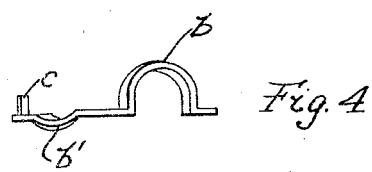
Fig. 4 is a side elevation of a single section.

Referring to the drawings the retainer A, shown in Fig. 1, is formed of a plurality of interlocking sections B, each of which is formed upon the arc of a circle as shown more clearly in Fig. 3. Each of the sections B is constructed to form an upper and lower retaining portion $b$, $b'$ respectively for two separate balls or rotative elements C, and are so arranged that said rotative elements are spaced predetermined distances apart when assembled in the retainer as shown in Fig. 1.

When assembled one of the retaining portions B registers with a retaining portion $b'$ in the next section thereof and together form a ball retaining seat which embraces the ball at points diametrically opposite each other and coincident with the axis of rotation thereof.

One end of each of the sections B is provided with a pin or locking member $c$ which is preferably formed integrally with said section and bent practically at right angles thereto. Between the retaining portions $b'$ and $b$ in each section is provided an opening $c'$ and at the opposite end of each section next to the retaining portion $b$ is also an opening $c^2$.

In assembling these different sections, each projection $c$ extends through the opening $c'$ of the second section, and through the opening $c^2$ of the third section, the extending portion of said pin or locking member $c$ being then bent and clenched to rivet the three parts together, thereby securely locking them in place.

Each separate section is so arranged as to size and dimensions that when assembled each ball or rotative element is embraced within a cage which prevents any displacement of the balls, but at the same time provides a very strong rigid structure which will very effectively resist the strains and thrusts accompanying the practical operation of bearings particularly under high speed.

In this construction the rotative elements are at all times securely retained in their proper spaced relationship to each other; are given ample surface contact through the axis of rotation as well as circumferentially; are properly guided in their rotative action during operation, and balanced through the centers of the rotative elements at right angles to the axis of rotation.

It will be observed in this construction that each section is interlocked with two other sections forming the annular retainer A which provides an inner circumferential rotative surface and an outer circumferential rotative surface of all balls forming the construction; contact with the rotative members at all times being in a direction opposite the axis of rotation, shown more clearly in Fig. 3. In this construction each section carries its own locking member and when assembled to form the retainer is interlocked with two additional sections, each of which forms a different arc of the circle constituting the retaining ring and when locked in place completes a perfectly rigid retaining ring. By interlocking each section with not less than two other sections it will be seen that the retaining member is braced firmly against any lateral or circumferential movement.

I claim:

1. In a retainer for antifriction bearings, the combination of rotative members, with a retaining frame comprising a plurality of sections each formed upon the arc of a circle and having retaining portions engaging diametrically opposite sides of two rotative members, and interlocking means formed integrally with each of said sections.

2. In a retainer for antifriction bearings, the combination of rotative members with a retaining frame comprising a plurality of sections each formed upon the arc of a circle and having retaining portions embracing diametrically opposite sides of two rotative members, a locking member projecting at an angle from each of said sections, each of said sections having openings to receive the locking member of another section.

3. In a retainer for antifriction bearings, the combination of rotative members, with a retaining frame comprising a plurality of sections each formed upon the arc of a circle and having retaining portions embracing diametrically opposite sides of two rotative members, each section having a locking member formed integrally therewith at one end thereof and adapted to engage through openings in two other sections forming the retainer, substantially as described.

4. A retainer for rotative members comprising a plurality of interlocking sections having portions adapted to embrace opposite sides of different rotative members, and each section having interlocking engagement with a plurality of other like sections at more than two points on the arc of a circle.

5. A retainer for rotative members comprising a plurality of interlocking sections, each of said sections having portions adapted to embrace opposite sides of different rotative members, and means formed integrally with each section for interlocking it with at least two other sections to form an annular retainer.

In testimony whereof I have signed this specification.

JOSEPH SPANITZ.